United States Patent [19]
Hara

[11] Patent Number: 5,801,308
[45] Date of Patent: Sep. 1, 1998

[54] MEASURING APPARATUS FOR MEASURING AN INJECTED QUANTITY OF LIQUID

[75] Inventor: Hideaki Hara, Chiryu, Japan

[73] Assignee: Denso Corporation, Kariya, Japan

[21] Appl. No.: 923,270

[22] Filed: Sep. 4, 1997

[51] Int. Cl.$^6$ .................................................. G01F 3/24
[52] U.S. Cl. ............................................................. 73/223
[58] Field of Search .......................... 73/113, 114, 149, 73/861.01–861.03, 861.39, 223

[56] References Cited

FOREIGN PATENT DOCUMENTS 64-63649  3/1989  Japan .
4-121623  4/1992  Japan .

*Primary Examiner*—Robert Raevis
*Attorney, Agent, or Firm*—Cushman Darby & Cushman IP Group of Pillsbury Madison & Sutro LLP

[57] ABSTRACT

A measuring apparatus according to the present invention for measuring an injected quantity of fuel at pilot injection in an internal combustion engine, particularly, a diesel engine, which performs main injection process after the pilot injection process, includes: an injection pump for injecting fuel every one injection period; a closed pressure vessel for temporarily storing the fuel injected from the injection pump; a detection unit for detecting change of pressure of the fuel within the pressure vessel; a volume-variable device having a predetermined volume and coupled to the pressure vessel; and a measurement control unit for measuring the injected quantity of the fuel at one injection period based on result of detection by the detection means, by calculating the injected quantity at pilot injection based on a ratio of the change of pressure within the pressure vessel at injection of the fuel and the change of the pressure within the pressure vessel caused by change of the predetermined volume before injection of the fuel. In the present invention, the injection quantity of fuel at pilot injection is measured separately from the injection quantity of fuel at main injection.

10 Claims, 7 Drawing Sheets

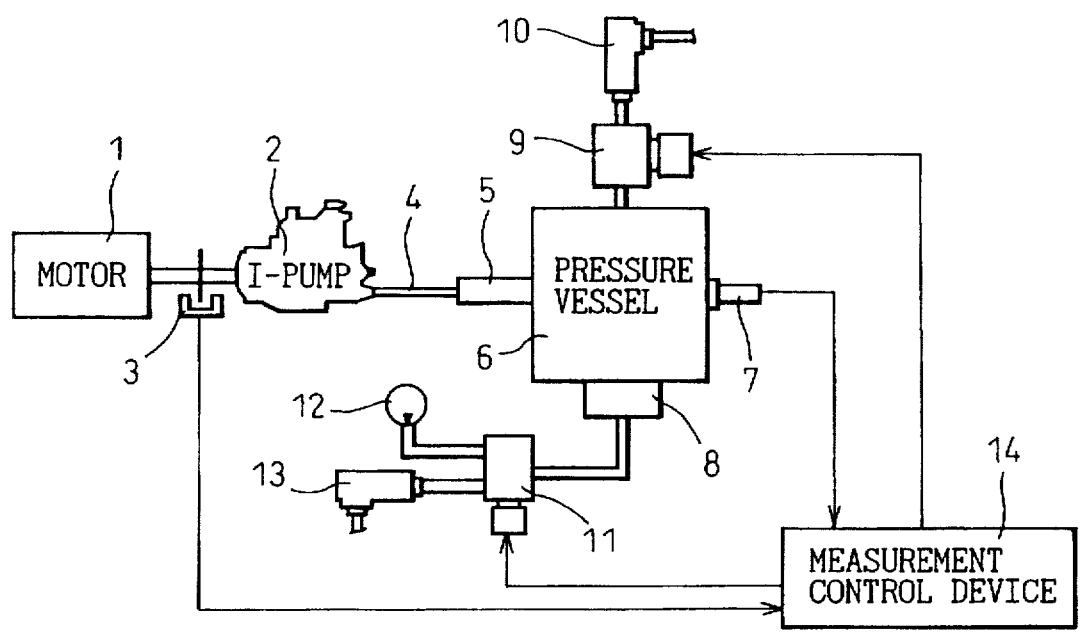

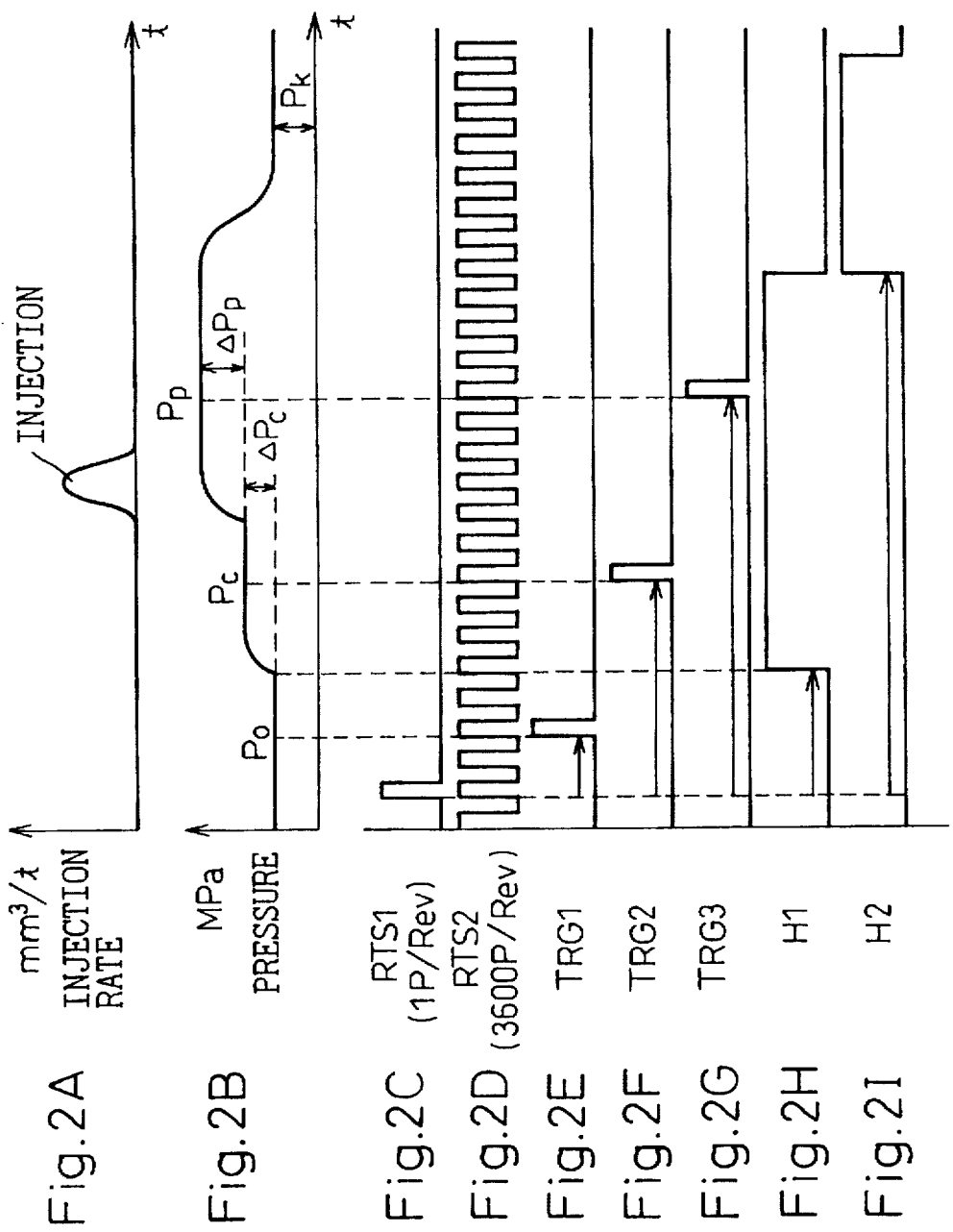

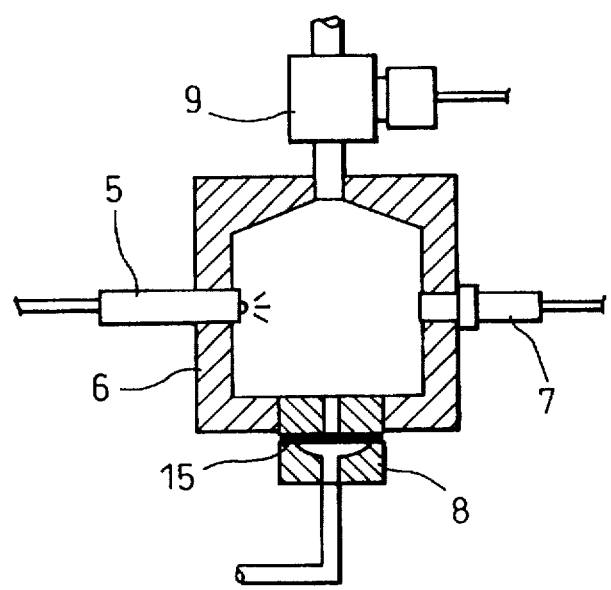

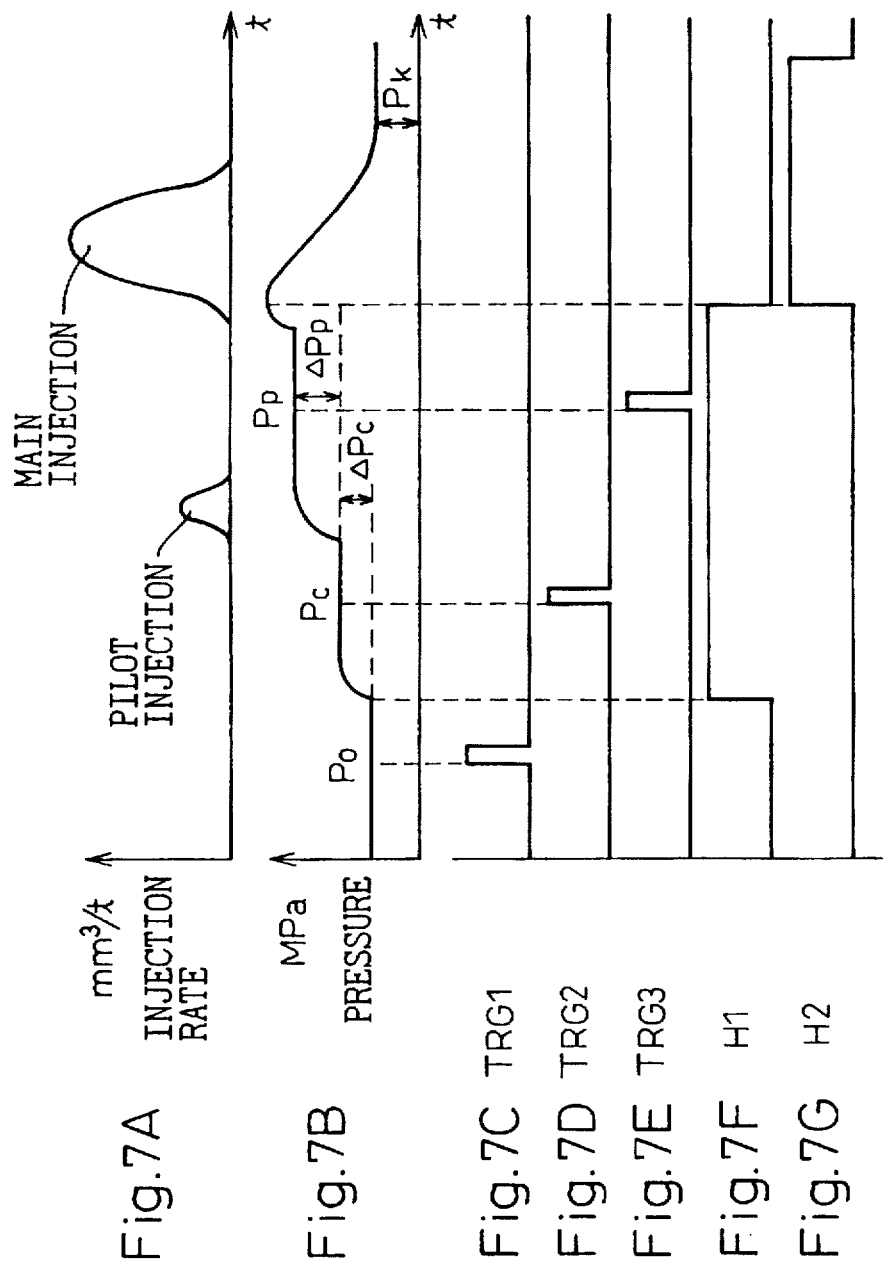

MEASURING APPARATUS FOR MEASURING AN INJECTED QUANTITY OF LIQUID

BACKGROUND OF THE INVENTION

1. Field of the Invention

The present invention relates to a measuring apparatus for measuring an injected quantity of liquid. Particularly, it relates to a measuring apparatus for measuring a quantity of fuel injected by a fuel injection pump in an internal combustion engine. Particularly, in an internal combustion engine having a pilot injection process, i.e., a diesel engine, the present invention allows high speed measurement of a quantity of fuel injected in the pilot injection process separated from the main injection process.

2. Description of the Related Art

In general, it is known that there is the following relationship between a change of pressure $\Delta P$ and an injected quantity $\Delta q$ of liquid within a closed vessel.

$$\Delta P = (K/V) \cdot \Delta q \quad (1)$$

Where, K is a volume elastic coefficient, and V is an inner volume within the closed pressure vessel.

In general, since the volume elastic coefficient K changes in accordance with temperature, the volume elastic coefficient K also changes at the time when the liquid is actually injected and at the time when the injected quantity is measured.

In this case, when the volume elastic coefficient at the time of injection is given by $K_1$, and when the injected quantity at that time is given by $\Delta q_1$, the injected quantity $\Delta q_1$ can be expressed by the following formula based on the above formula (1).

$$\Delta q_1 = (V/K_1) \cdot \Delta P \quad (2)$$

On the other hand, when the volume elastic coefficient K at the time when calculating the injection quantity is given by $K_2$, and when the injected quantity at that time is given by $\Delta q_2$, the injected quantity $\Delta q_2$ can be expressed by the following formula as well as the above formula (2).

$$\Delta q_2 = (V/K_2) \cdot \Delta P \quad (3)$$

As explained above, the volume elastic coefficient $K_1$ at the time of injection does not coincide with the volume elastic coefficient $K_2$ at the time of calculation. This is caused by influence of temperature, and an error occurs in the injected quantity at the time of measurement because of change of temperature.

In the measurement of the injected quantity of fuel in an internal combustion engine, particularly, in a diesel engine, since the measurement of the injected quantity at the pilot injection by the pilot injection pump is performed separately from the main injection, it is necessary to provide a high speed measuring apparatus for measuring the injected quantity at the pilot injection.

Concretely, for example, Japanese Unexamined Patent Publication (Kokai) 64-63649 discloses a method for obtaining an injected quantity based on the pressure within the closed vessel during injection of diesel fuel and on a pressure rate of the diesel fuel.

In this case, since the pressure rate changes in accordance with the pressure and temperature, the pressure rate is previously obtained, and the pressure rate corrected based on the pressure and temperature is used as the pressure rate at measurement. In this case, the pressure rate is given by an inverse number of the volume elastic coefficient.

As another measuring method of utilizing a change of pressure, for example, the Japanese Unexamined Patent Publication (Kokai) 4-121623 discloses a method for obtaining a quantity at the pilot injection by distributing a total quantity of injection based on the pressure ratio in accordance with a pressure value at injection of the diesel fuel within the closed pressure vessel and a quantity at the pilot and main injection measured by a flow meter. In this method, the pressure ratio is utilized and there is an advantage in which there is no influence on the pressure rate.

In the former method (JPP-64-63649), however, there is a problem that it is impossible to perform the measurement of the injected quantity with high precision if the obtained pressure rate is different from the pressure rate at the time of measurement after a predetermined time has elapsed.

On the other hand, in the latter method (JPP-4-121623), there is a problem that it is impossible to measure a fine quantity at the pilot injection with high precision if the quantity at the main injection is very large compared to the quantity at the pilot injection.

SUMMARY OF THE INVENTION

Therefore, an object of the present invention is to provide a measuring apparatus for measuring an injected quantity which can measure an injected quantity of liquid, particularly, an injected quantity of fuel in an internal combustion engine, with high precision for every injection period, without influence on the volume elastic coefficient, which changes are caused by temperature; can measure a quantity at the pilot injection separating it from a quantity at the main injection when measuring a total quantity of injection based on the pilot injection and the main injection; and can measure an injected quantity with high precision without influence caused by an increase or decrease of the quantity at the main injection.

According to the invention defined in claim 1, the measuring control means calculates the injected quantity at a time of an injection of liquid in accordance with a ratio of a change of pressure within the pressure vessel at an injection of liquid, and, before an injection of liquid, a change of pressure within the pressure vessel caused by a change in a predetermined volume of a volume-variable device coupled to the pressure vessel which temporarily stores the fuel. As a result, it is possible to measure an injected quantity with high precision for every injection period without influence on the volume elastic coefficient of liquid, which change is caused by temperature.

According to the invention defined in claims 2 and 3, in the internal combustion engine, the measuring control means calculates the quantity of fuel injection at the time of injection in accordance with a ratio of a change of pressure within the pressure vessel during fuel injection, and, before fuel injection, a change of pressure within the pressure vessel caused by a change in a predetermined volume of the volume-variable device coupled to the pressure vessel.

As a result, it is possible to measure an injected quantity of fuel with high precision for every injection period without influence on the volume elastic coefficient of fuel, which change is caused by temperature. Further, in the pilot injection, since it is possible to measure a quantity at the pilot injection separate from the main injection, it is possible to measure a fine quantity at the pilot injection without influence at the main injection even if the quantity at the main injection is very large.

BRIEF DESCRIPTION OF THE DRAWINGS

In the drawings:

FIG. 1 shows one example of a whole structure applying the present invention;

FIGS. 2A to 2I show signal timing charts at a time of measurement in a measurement control device;

FIG. 3 shows an essential structure of a pressure vessel and a volume-variable device;

FIGS. 7A to 7G show signal timing charts at a time of measurement in the measurement control device.

DESCRIPTION OF THE PREFERRED EMBODIMENTS

Figure 4A:
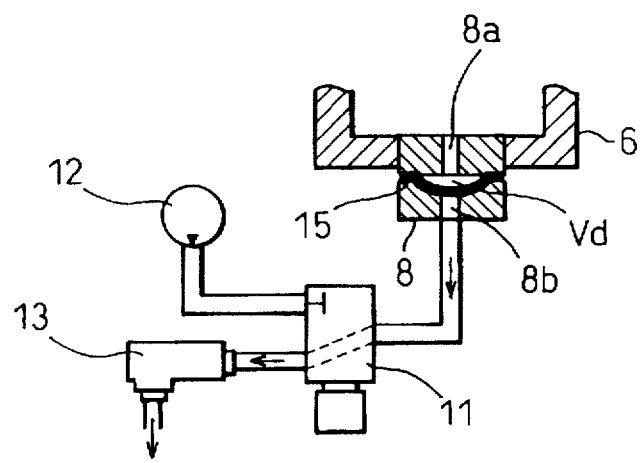
FIGS. 4A and 4B are views for explaining operation of the volume-variable device.

The essential points of the present invention will be explained below.

In the measurement of the injected quantity of fuel in the internal combustion engine, particularly, the measurement of the injected quantity of fuel at the diesel engine, when the injected quantity is obtained based on a change of pressure within a closed pressure vessel when the diesel fuel is injected into the pressure vessel. A predetermined volume $\Delta V$ within the volume-variable device is known and changed for every injection period.

Based on the pressure ratio ($\Delta P_p/\Delta P_c$) of the change of pressure ($\Delta P_c$) within the closed pressure vessel caused by the change of the predetermined volume $\Delta V$ and the change of pressure ($\Delta P_p$) at fuel injection, the quantity of fuel ($\Delta q$) injected can be obtained.

The measuring method according to the present invention can be applied not only the injected quantity at the pilot injection, but also the injection quantity at a single injection.

That is, the present invention determines that the ratio of the change of the pressure within the pressure vessel at change of the predetermined volume and the change of pressure at fuel injection is equal to the ratio between a quantity of change of the predetermined volume and an injected quantity. Accordingly, the injected quantity ($\Delta q$) can be measured based on the ratio of change of pressure ($\Delta P_p/\Delta P_c$) and the ratio of a quantity of change of the predetermined volume and an injected quantity ($\Delta q/\Delta V$).

As is obvious from the following calculation, the (K/V) item in the formula can be deleted by using the ratio of change of pressure. As a result, it is possible to eliminate the influence on the volume elastic coefficient K caused by temperature.

On the other hand, there may be a problem in which the above formula may not be realized if the volume elastic coefficient at change of a predetermined volume does not coincide with the volume elastic coefficient at fuel injection. However, in the present invention, the above problem can be solved as explained below. That is, since the ratio of the change of pressure within the pressure vessel is calculated for every injection period (i.e., for very short term), the change of the temperature during this term is very small and can be negligible so that no influence is applied to the actual measurement of an injected quantity.

The essential portions of the measuring method according to the present invention will be explained below.

When the pressure within the pressure vessel is changed, this change being generated at when changing a predetermined volume ($\Delta V$) within the volume-variable device coupled to the pressure vessel, is given by $\Delta P_c$, and when the volume elastic coefficient at that time is given by $K_c$, the change of pressure $\Delta P_c$, can be expressed by the following formula.

$$\Delta P_c = (K_c/V) \cdot \Delta V \tag{4}$$

On the other hand, when a change of pressure caused by the injected quantity of fuel ($\Delta q$) at injection is $\Delta P_p$, and when the volume elastic coefficient at that time is $K_p$, the following formula can be obtained from the above formula (1).

$$\Delta P_p = (K_p/V) \cdot \Delta q \tag{5}$$

Since $\Delta P_c$, is proportional to $\Delta V$, and $\Delta P_p$ is also proportional to $\Delta q$, the following formula can be obtained from the formulas (4) and (5).

$$\Delta P_p/\Delta P_c = (K_p \cdot \Delta q)/(K_c \cdot \Delta V) \tag{6}$$

As explained above, since coefficient $K_c$ is $K_p$ in a very short term for every injection period, the formula (6) can be expressed by $$\Delta P_p/\Delta P_c = \Delta q/\Delta V$$

Accordingly, the injected quantity $\Delta q$ can be expressed by the following formula.

$$\Delta q = (\Delta P_p/\Delta P_c) \cdot \Delta V \tag{7}$$

Therefore, in the present invention, since the volume elastic coefficient K which changes in response to temperature can be deleted from the formula, it is possible to realize very precise measurement of injected quantity without the influence of temperature.

As mentioned hereinafter, in the present invention, since the change of the predetermined volume $\Delta V$ is calculated from displacement of a diaphragm which can do displacement with high speed, it is possible to realize high speed change of the predetermined volume $\Delta V$ for every injection period. Further, since the predetermined volume is used as a reference without use of another volume meter, it is possible to realize a very small error in measurement.

By using the present invention, it is possible to measure not only injected quantity of fuel at a single injection, but also injected quantity of the pilot injection pump by separating it from the injected quantity at the main injection. That is, using the formula (7) as mentioned above, before the pilot injection, the predetermined volume $\Delta V$ within the volume-variable device coupled to the pressure vessel is changed, the injected quantity $\Delta q$ can be obtained based on the change of pressure ($\Delta P_c$) within the pressure vessel and the change of pressure ($\Delta P_p$) at the pilot injection.

Accordingly, the measured value of injected quantity at the pilot injection is not influenced by the large injected quantity at the main injection which is performed after the pilot injection, and measurement can be performed separately from the main injection with high speed. Further, when measuring the total injected quantity (i.e., injected quantity at the pilot injection + injected quantity at the main injection), it is possible to realize this measurement by providing a conventional flow meter after the present invention.

Various preferred embodiments will be explained in detail, with reference to the drawings, below.

FIG. 1 shows one example of a whole structure applying the present invention. In the drawing, reference number 1 represents a motor. Reference number 2 denotes an injection pump (I-PUMP) which is driven by the motor 1. Reference number 3 denotes an encoder for detecting rotation of the injection pump 2. Reference number 4 denotes a high pressure pipe coupled to the injection pump 2. Reference number 5 denotes an injection nozzle coupled to the high pressure pipe 4. Reference number 6 denotes a closed pressure vessel which temporarily stores the fuel injected by the injection nozzle 5.

Reference number 7 denotes a pressure sensor for detecting the pressure within the pressure vessel 6. Reference number 8 denotes a volume-variable device mounted to the pressure vessel 6. Reference number 9 denotes a two-way electromagnetic valve mounted to the pressure vessel 6. Reference number 10 denotes a backing pressure valve mounted to the two-way electromagnetic valve 9. Reference number 11 denotes a three-way electromagnetic valve coupled to the volume-variable device 8.

Reference number 12 denotes a pressure generating source coupled to the three-way electromagnetic valve 11. Reference number 13 denotes a backing pressure valve coupled to the three-way electromagnetic valve 11. Reference number 14 denotes a measurement control device for controlling the operation of the two-way electromagnetic valve 9 and the three-way electromagnetic valve 11 based on the pressure sensor 7 and the encoder 3.

In the above structure, the fuel injection pump 2 is driven by the motor 1, and rotation of the injection pump 2 is detected by the encoder 3. A signal from the encoder 3 is output to the measurement control device 14. Further, the fuel pressured by the injection pump 2 is injected into the pressure vessel 6 from the injection nozzle 5 via the high pressure 4. The sensor 7, the volume-variable device 8 and the two-way electromagnetic valve 9 are mounted to the pressure vessel 6. Further, the backing pressure valve 10 is provided to an outlet of the two-way electromagnetic valve 9.

Figure 4B:
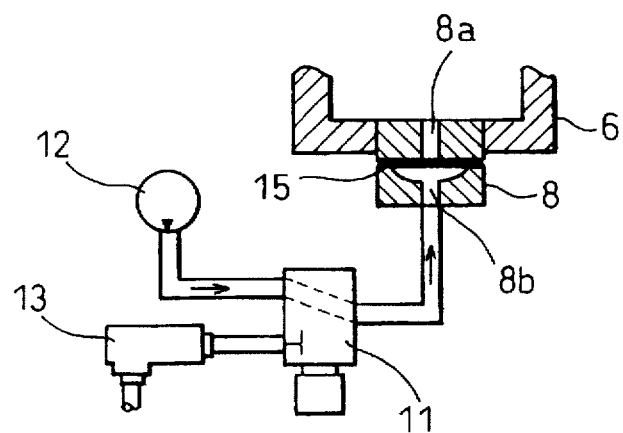

Further, a predetermined volume Vd is provided within the volume-variable device 8 (see FIG. 4A), and a the predetermined volume Vd is changed in accordance with displacement of the diaphragm 15 (see FIGS. 3, 4A and 4B).

FIG. 3 shows an essential structure of the pressure vessel 6 and the volume-variable device 8, and FIGS. 4A and 4B are views for explaining the operation of the volume-variable device 8.

First, the operation of the diaphragm 15 will be explained in detail with reference to FIGS. 4A and 4B. As shown in FIG. 4A, when the three-way electromagnetic valve 11 is turned off (closed) (i.e., the pressure from the pressure generating source 12 is not added to the valve 11), the pressure within a volume 8b of the volume-variable device 8 is maintained by the pressure which is set by the backing pressure valve 13 via the three-way electromagnetic valve 11 (see arrow line). In this case, the pressure of the backing pressure valve 13 is set to the pressure lower than that of the backing pressure valve 10.

When the pressure within the volume 8b is lower than the pressure within a volume 8a, the diaphragm 15 is deformed as shown by thick solid line in FIG. 4A. That is, the diaphragm 15 is placed along an inner wall of a side of the volume 8b. As a result, a volume having a predetermined volume Vd can be provided in the side of the volume 8a.

Next, as shown in FIG. 4B, when the three-way electromagnetic valve 11 is turned on (opened), the volume 8b of the volume-variable device 8 is coupled to the pressure generating source 12 so that the pressure from the pressure generating source 12 is added to the volume 8b (see arrow line). In this case, the pressure of the pressure generating source 12 is set to the pressure higher than the maximum pressure (the pressure after the fuel was injected) within the pressure vessel 6.

When the pressure within the volume 8b is higher than the pressure within the volume 8a, the diaphragm 15 is returned as shown by thick solid line in FIG. 4B. That is, the diaphragm 15 is placed along an inner wall of a side of the volume 8a. As a result, the volume having a predetermined volume Vd disappears.

Figure 5:
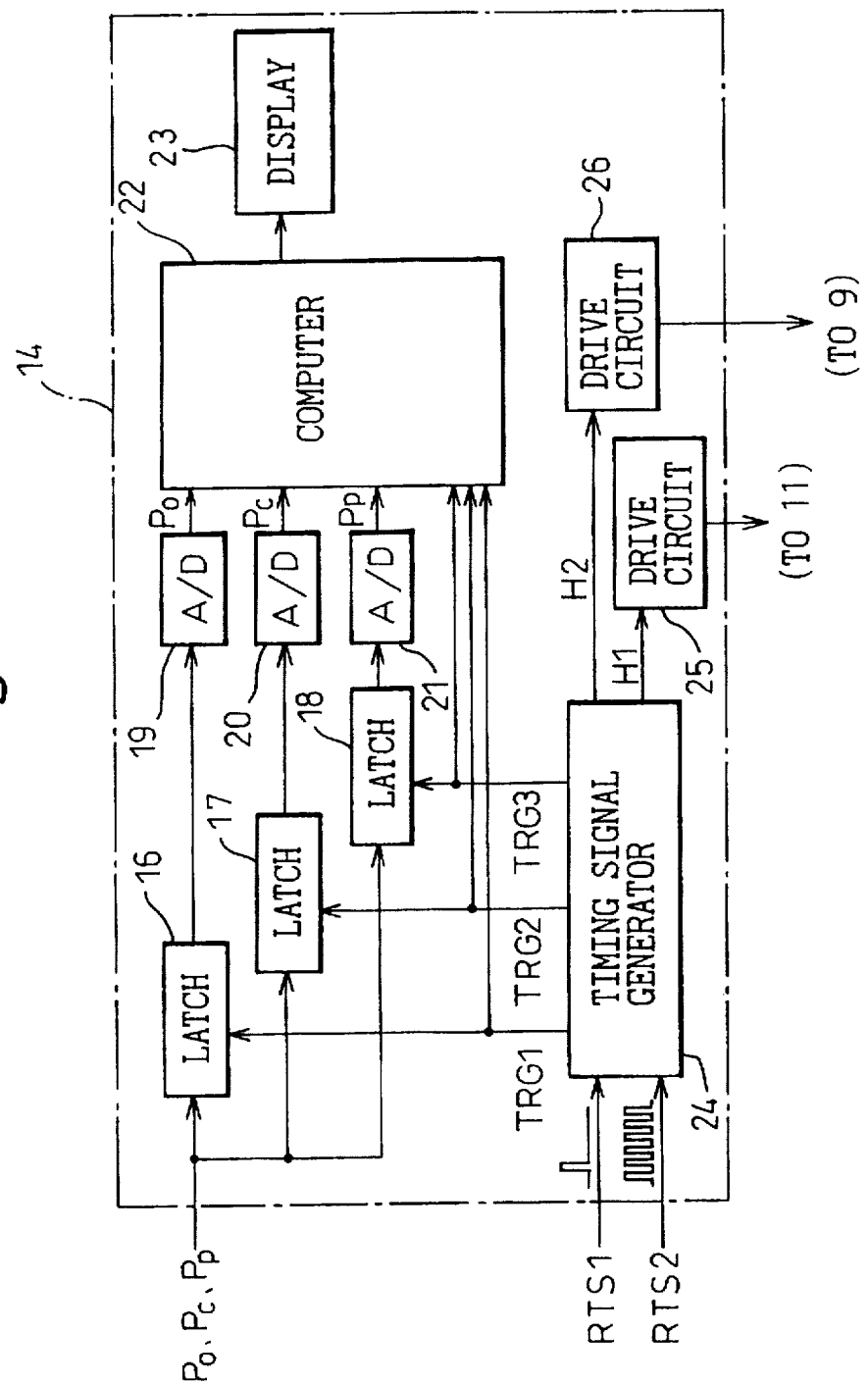
FIG. 5 shows a detailed structure of the measurement control device shown in FIG. 1.

FIGS. 2A to 2I show signal timing charts at a time of measurement in the measurement control device. FIG. 5 shows a detailed structure of the measurement control device 14 shown in FIG. 1.

The measurement control device 14 receives the rotation signal from the encoder 3, and starts the two-way electromagnetic valve 9 and three-way electromagnetic valve 11 in accordance with a predetermined timing. Further, the measurement control device 14 receives a pressure signal indicating the pressure within the pressure vessel 6 from the pressure sensor 7, and obtains the injected quantity. The obtained injected quantity is displayed by a display 23.

In FIG. 5, reference numbers 16, 17 and 18 denote latch circuits to receive pressures $P_o$, $P_c$ and $P_p$ from the pressure sensor 7. Each output from the latch circuits 16, 17 and 18 is converted to a digital signal by each A/D converter 18, 19 and 20. The pressures $P_o$, $P_c$ and $P_p$ converted to the digital signals are output to a computer 22. Reference number 24 denotes a timing signal generator to generate a trigger signal. Reference number 25 denotes an electromagnetic valve drive circuit to drive the three-way electromagnetic valve 11 in accordance with a drive signal H1. Reference number 26 denotes an electromagnetic valve drive circuit to drive the two-way electromagnetic valve 9 in accordance with a drive signal H2. Still further, reference number 23 denotes a display apparatus to display the injected quantity of fuel.

The operation of the measurement control device will be explained in detail with reference to FIGS. 1, 2 and 5.

When the timing signal generator 24 of the measurement control device 14 receives rotation signals RTS1 and RTS2 from the encoder 3 (see FIGS. 2C and 2D), the timing signal generator 24 generates trigger signals TRG1, TRG2 and TRG3 to the latch circuits 16, 17 and 18 (see FIGS. 2E, 2F and 2G). That is, as shown in FIGS. 2E, 2F and 2G, the trigger signal TRG1 is generated at the time of the pressure value $P_o$, the trigger signal TRG2 is generated at the time of the pressure value $P_c$, and the trigger signal TRG3 is generated at the time of the pressure value $P_p$.

As explained above, the timing signal generator 24 generates the drive signal H1 (see FIG. 2H) for driving the three-way electromagnetic valve 11 and the drive signal H2 (see FIG. 2I) for driving the two-way electromagnetic valve 9. Further, the timing signal generator 24 generates trigger signals TRG1, TRG2 and TRG3 to the corresponding latch circuits 16, 17 and 18 in order to hold each pressure value $P_o$, $P_c$, and $P_p$ from the pressure sensor 7. The pressure values $P_o$, $P_c$ and $P_p$ latched in the latch circuit 16, 17 and 18 are converted to digital pressure values by the A/D converters 19, 20 and 21, and the digital pressure values are output to the computer 22.

First, in the timing of the trigger signal TRG1, the two-way electromagnetic valve 9 is closed, the fuel filles the pressure vessel 6, and a predetermined backing pressure $P_k$ is added to the pressure vessel 6 from the backing pressure valve 10. At that time, the pressure value $P_o$ is sent to the computer 22.

Next, when the three-way electromagnetic valve 11 is turned on (opened) at the time of the drive signal H1, the pressure from the pressure generating source 12 is added to the diaphragm 15 so that the diaphragm 15 is displaced from the state shown in FIG. 4A to the state shown in FIG. 4B. Accordingly, the fuel within the volume-variable device 8 (i.e., the fuel within the predetermined volume Vd) flows out to the pressure vessel 6.

As a result, the pressure within the pressure vessel 6 rises by the pressure value $\Delta P_c$, based on the fuel which flowed out from the predetermined volume Vd. At that time, i.e., at the timing of the change of the predetermined volume Vd, the pressure $P_c$ within the pressure vessel 6 is sent to the computer 22.

In this case, the timings of the trigger signal TRG1, of the drive signal H1 and of the trigger signal TRG2 are set so as to be performed before the fuel from the injection nozzle 5 is injected into the pressure vessel 6 (see FIGS. 2E, 2F and 2H).

After the trigger signal TRG2 is generated from the timing signal generator 24, when the fuel is injected from the injection nozzle 5 into the pressure vessel 6 as shown in FIG. 2A, the pressure within the pressure vessel 6 rises by the pressure value $\Delta P_p$. The pressure $P_p$ within the pressure vessel 6 is sent to the computer 22.

After the trigger signal TRG3 is generated, when the two-way electromagnetic value 9 is opened in the timing of the drive signal H2, the fuel within the pressure vessel 6 is removed via the backing pressure valve 10. When the fuel is removed, the three-way electromagnetic value 11 is closed and the diaphragm 15 returns to the state shown in FIG. 4A. In this case, the removal of the fuel is continued until the pressure within the pressure vessel 6 becomes the value $P_k$.

At the time of complete removal of the fuel, the two-way electromagnetic value 9 is closed at the time of the drive signal H2 so that the pressure vessel 6 is returned to the closed sate.

The operation in the computer will be explained in detail below. As shown in FIG. 5, the computer 22 calculates change of the pressure values $\Delta P_c$ (=$P_c$–$P_o$) and $\Delta P_p$ (=$P_p$–$P_c$) based on the digital pressure values $P_o$, $P_c$ and $P_p$ which were sent from the A/D converters 19, 20 and 21. As explained above, the pressure value $\Delta P_c$, indicates the change of pressure within the pressure vessel 6 when the fuel within the predetermined volume $\Delta V$ is added to the pressure vessel 6. Further, the pressure value $\Delta P_p$ indicates the change of pressure within the pressure vessel 6 when the injected quantity $\Delta q$ of fuel from the injection nozzle 5 is added to the pressure vessel 6.

Accordingly, as shown by the above formula (1), the injected quantity $\Delta q$ is proportional to the change of pressure $\Delta P_p$ based on the basic formula $\Delta P=(K/V)\cdot\Delta q$. Further, since the predetermined volume $\Delta V$ is also proportional to the change of pressure $\Delta P_c$, these relationships can be expressed by the following formula.

$$\Delta V \cdot \Delta P_c = \Delta q \cdot \Delta P_p$$

Therefore, as shown by the formula (7), the injected quantity can be expressed by the formula $$\Delta q = (\Delta P_p / \Delta P_c) \cdot \Delta V$$

As explained above, in the measurement of the injected quantity at the single fuel injection, it is possible to measure the injected quantity with high speed without influence of the volume elastic coefficient, which changes due to temperature. Further, as explained in detail below, it is possible to measure the injected quantity at the pilot injection separate from the main injection for every injection period without influence of increase or decrease of the main injection.

In FIGS. 2C and 2D, the rotation signal RTS1 is output from the encoder 3 at one pulse per one rotation of the motor (1P/Rev). Further, the rotation signal RTS2 is also output from encoder at 3600 pulses per one rotation of the motor (3600P/Rev). That is, the rotation signal RTS1 is output by one pulse per one rotation of the injection pump, and is used for detecting an absolute position of the rotation. Accordingly, the interval between one pulse and next pulse represents one injection period.

On the other hand, the rotation signal RTS2 is output by 3600pulses per one rotation of the injection pump. The rotation signal RTS2 is used as a timing signal in order to generate the trigger signals TRG1, TRG2 and TRG3, respectively.

Figure 6:
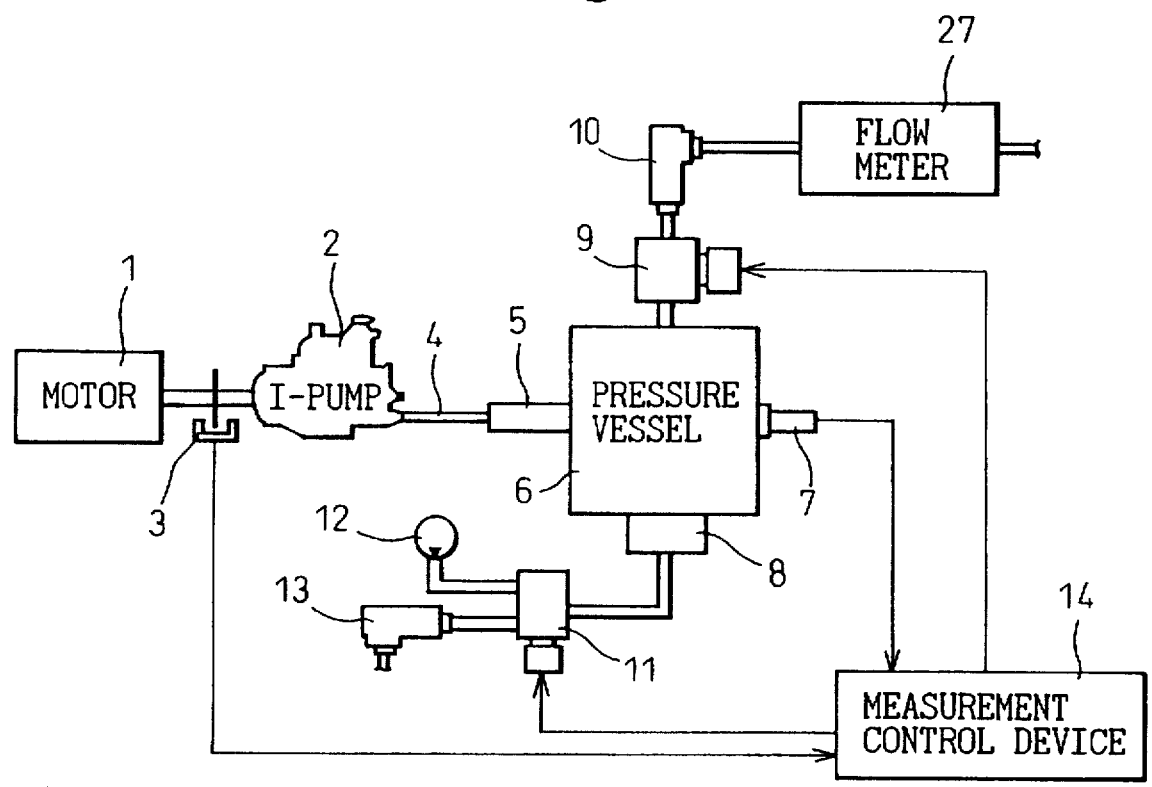
FIG. 6 shows another example of a whole structure applying the present invention.

FIG. 6 shows another example of a whole structure applying the present invention. In this drawing, the same reference numbers used in FIG. 1 are attached to the same components in this drawing. This example is used for explaining the main injection which is performed after the pilot injection. Reference number 27 denotes a flow meter which is provided for measuring the total injection quantity, i.e., pilot injection + main injection.

As mentioned above, it is possible to obtain the injected quantity $\Delta q$ at the pilot injection separate from the main injection. Accordingly, if the injected quantity at the main injection is required, it is possible to easily obtain by subtracting the injected quantity at the pilot injection from the total injected quantity which is measured by the flow meter 27.

FIGS. 7A to 7G show signal timing charts at a time of measurement in the measurement control device 14. The time of the main injection is added to this flowchart as shown in FIG. 7B. Other timing charts are the same as FIGS. 2A and 2E to 2I.

The timing signal generator 24 generates the drive signal H2 to the drive circuit 26 which controls turning on/off of the two-way electromagnetic valve 9. As mentioned above, when the fuel is injected from the injection nozzle 5 to the pressure vessel 6 after the trigger signal TRG2 was generated, the pressure within the pressure vessel rises by the value $\Delta P_p$. The pressure value $P_p$ within the pressure vessel 6 is sent to the computer 6 in the timing of the trigger signal TRG3.

After above steps, when the two-way electromagnetic valve 9 is opened, the fuel within the pressure vessel 6 is removed to the flow meter 27 via the backing pressure valve 10. At the same time, the three-way electromagnetic valve 11 is closed so that the diaphragm 15 is returned to the state shown in FIG. 4A.

Further, the exhaust of the fuel is continued until the pressure within the pressure vessel 6 becomes the value $P_k$. At the time of completion of the exhaust, the two-way electromagnetic valve 9 is closed so that the pressure vessel 6 is returned to the closed state. Accordingly, the total injection quantity is measured during the term when the drive signal H2 is turned on (i.e., in a high level state).

I claim:

1. A measuring apparatus for measuring an injected quantity of liquid, comprising:

an injection pump for injecting liquid every one injection period;

a closed pressure vessel for temporarily storing the liquid injected from the injection pump;

a detection means for detecting change of pressure of the liquid within the pressure vessel;

a volume-variable device, having a predetermined volume, coupled to the pressure vessel; and a measurement control means for measuring the injected quantity of the liquid at one injection period based on result of detection by the detection means, by calculating the injected quantity at injection of the liquid based on a ratio of the change of pressure within the pressure vessel at injection of the liquid and the change of the pressure within the pressure vessel caused by change of the predetermined volume before injection of the liquid.

2. A measuring apparatus for measuring an injected quantity of fuel in an internal combustion engine, comprising:

an injection pump for injecting fuel every one injection period;

a closed pressure vessel for temporarily storing the fuel injected from the injection pump;

a detection means for detecting change of pressure of the fuel within the pressure vessel;

a volume-variable device, having a predetermined volume, coupled to the pressure vessel; and a measurement control means for measuring the injection quantity of the fuel at one injection period based on result of detection by the detection means, by calculating the injected quantity at injection of the fuel based on a ratio of the change of pressure within the pressure vessel at injection of the fuel and the change of the pressure within the pressure vessel caused by change of the predetermined volume before injection of the fuel.

3. A measuring apparatus for measuring an injected quantity of fuel at pilot injection in an internal combustion engine which performs main injection after the pilot injection, comprising:

an injection pump for injecting fuel every one injection period;

a closed pressure vessel for temporarily storing the fuel injected from the injection pump;

a detection means for detecting change of pressure of the fuel within the pressure vessel;

a volume-variable device, having a predetermined volume, coupled to the pressure vessel; and a measurement control means for measuring the injected quantity of the fuel at one injection period based on result of detection by the detection means, by calculating the injected quantity at pilot injection based on a ratio of the change of pressure within the pressure vessel at injection of the fuel and the change of the pressure within the pressure vessel caused by change of the predetermined volume before injection of the fuel.

4. A measuring apparatus for measuring an injected quantity of fuel as claimed in claim 3, wherein the internal combustion engine is a diesel engine.

5. A measuring apparatus for measuring an injected quantity of fuel as claimed in claim 3, wherein the injected quantity of fuel at pilot injection is measured separate from the injected quantity of fuel at main injection.

6. A measuring apparatus for measuring an injected quantity of fuel as claimed in claim 1, wherein the volume-variable device comprises a diaphragm therein so that change of the predetermined volume is defined based on displacement of the diaphragm.

7. A measuring apparatus for measuring an injected quantity of fuel as claimed in claim 2, wherein the volume-variable device comprises a diaphragm therein so that change of the predetermined volume is defined based on displacement of the diaphragm.

8. A measuring apparatus for measuring an injected quantity of fuel as claimed in claim 3, wherein the volume-variable device comprises a diaphragm therein so that change of the predetermined volume is defined based on displacement of the diaphragm.

9. A measuring apparatus for measuring an injected quantity of liquid as claimed in claim 1, wherein a volume elastic coefficient of the liquid at injection is defined as the same volume elastic coefficient of the liquid at measurement in the measurement control means.

10. A measuring apparatus for measuring an injected quantity of fuel as claimed in claim 2 or 3, wherein a volume elastic coefficient of the fuel at injection is defined as the same volume elastic coefficient of the fuel at measurement in the measurement control means.

* * * * *